United States Patent [19]

Owen et al.

[11] Patent Number: 5,435,803
[45] Date of Patent: Jul. 25, 1995

[54] CONTAINER FITMENT APPLICATOR

[75] Inventors: Barry C. Owen, Southfield; Leslie Pape, Novi; Robert C. Paulin, Commerce Township, Oakland County; Jack M. Neumayer, White Lake, all of Mich.

[73] Assignee: Elopak Systems A.G., Glattbrugg, Switzerland

[21] Appl. No.: 84,918

[22] Filed: Jul. 1, 1993

[51] Int. Cl.⁶ ............................................. B31B 1/84
[52] U.S. Cl. ........................................ 493/87; 53/410
[58] Field of Search .................... 493/87, 102, 105; 53/133.2, 133.3, 410

[56] References Cited

U.S. PATENT DOCUMENTS

| | | | |
|---|---|---|---|
| 4,386,923 | 6/1983 | Okushita | 493/87 |
| 4,788,811 | 12/1988 | Kawajiri | 493/87 |
| 5,267,934 | 12/1993 | Pape | 53/133.2 |

FOREIGN PATENT DOCUMENTS

| | | | |
|---|---|---|---|
| 0426360 | 5/1991 | European Pat. Off. | 493/87 |
| 2645503 | 10/1990 | France | 493/87 |
| 0296632 | 12/1990 | Japan | 53/133.2 |
| 2238287 | 5/1991 | United Kingdom . | |

*Primary Examiner*—Jack W. Lavinder
*Attorney, Agent, or Firm*—Reising, Ethington, Barnard & Perry

[57] ABSTRACT

There is disclosed herein, a container fitment applicator adaptable to applying a flanged pour spout fitment through an opening in a carton top panel while the carton is on a mandrel of a forming, filling and sealing machine. The applicator includes a rotatable shaft having a bar secured thereto, a vacuum cup or location spigot mounted on one end of the bar, and a roller mounted on the other end of the bar, with a chute and feeder coordinating the supplying of one fitment at a time to the vacuum cup. In one embodiment, the roller engages a first cam which serves to pivot the bar to position the fitment in the center portion of the mandrel to permit loading the carton onto the mandrel, with the fitment entering the panel opening as the roller leaves the cam under the force of a spring operatively connected to the bar. In a second embodiment, a spring positions the bar and fitment in the center portion of the mandrel for the carton loading, and a second cam engaged by the roller serves to extend the fitment into the panel opening. The flange of the fitment is sealed by an ultrasonic sealer and horn to the inner surface of the top panel around the opening while the second cam backs up the roller.

13 Claims, 4 Drawing Sheets

CONTAINER FITMENT APPLICATOR

FIELD OF THE INVENTION

This invention relates generally to container fitment applicators, more particularly to carton forming, filling and sealing machines which are adapted to apply pour spout fitments while the cartons are being processed on mandrels of a turret thereof.

BACKGROUND ART

Forming, filling and sealing machines having pour spout applicators operatively mounted thereon are known. For example, British Pape patent no. GB 2,238,287 discloses an application station at which a rotatable bar is provided, with the bar having a boss projecting therefrom. A pouring spout is placed on the boss by external means. As the carton is indexed into the application station, the bar is rotated in the direction of the carton travel and into the open top of each carton, aligning the boss with an opening formed in a selected panel of the top closure of the carton; the boss and pouring spout are moved laterally through the opening; the inner flanged end of the pouring spout is secured, such as by ultrasonic welding, to the inner wall around the opening; and the boss is withdrawn from the opening and then rotated out of the open top.

Other pouring spout applicators are disclosed in Kawajiri patent no. 4,788,811 and Okushita patent no. 4,386,923. Kawajiri discloses a horizontally elongated pour spout fitment attaching turret at a location upstream of the usual turret and radial mandrels on which the bottom end closure is folded and sealed. The fitment attaching turret includes a pusher at one station for pushing an open-ended package onto a sucker device holding and inserting a pour spout fitment into an opening in a package top panel. The fitment attaching turret is then rotated to a second station where an anvil is axially inserted into the package, cooperable with an ultrasonic horn for sealing a flange of the fitment to the inner surface of the top panel.

Okushita discloses a bag-in-box arrangement wherein a fitment is attached to the bag which is then inserted through a hole in flap of the box, while both are in the collapsed or blank state.

DISCLOSURE OF THE INVENTION

A general object of this invention is to provide an improved container fitment applicator.

Another object of the invention is to provide an improved carton pour spout fitment applicator for use on a carton forming, filling and sealing machine.

Yet another object of the invention is to provide an improved carton pour spout fitment applicator adaptable to applying the pour spout fitments to cartons while the cartons are being conveyed by mandrels of a carousel type turret.

A further object of the invention is to provide an improved pour spout fitment applicator adaptable to applying the pour spout fitment through an existing opening in an upper closure panel of a carton from the inside thereof, while the carton is on a mandrel and sealing the pour spout in the opening.

Still another object of the invention is to provide a pour spout fitment applicator adaptable to applying a flanged pour spout fitment through an opening in a carton panel while the carton is on a mandrel, including a pivotable shaft having a bar secured thereto with a roller mounted on one end and an anvil provided on the other end, a vacuum cup or a suitable mechanical locator, such as a location spigot, mounted on the anvil, and a pair of spaced-apart cams and cooperating resilient means, a chute and feeder segment for coordinating the supplying of one fitment at a time to the vacuum cup or location spigot adjacent the first cam, and an ultrasonic sealer and horn for sealing the flange of the fitment to the inner surface of the top panel around the opening adjacent the second cam.

These and other object and advantages of the invention will become more apparent when reference is made to the following drawings and the accompanying description.

BEST MODE OF CARRYING OUT THE INVENTION

Figure 1:
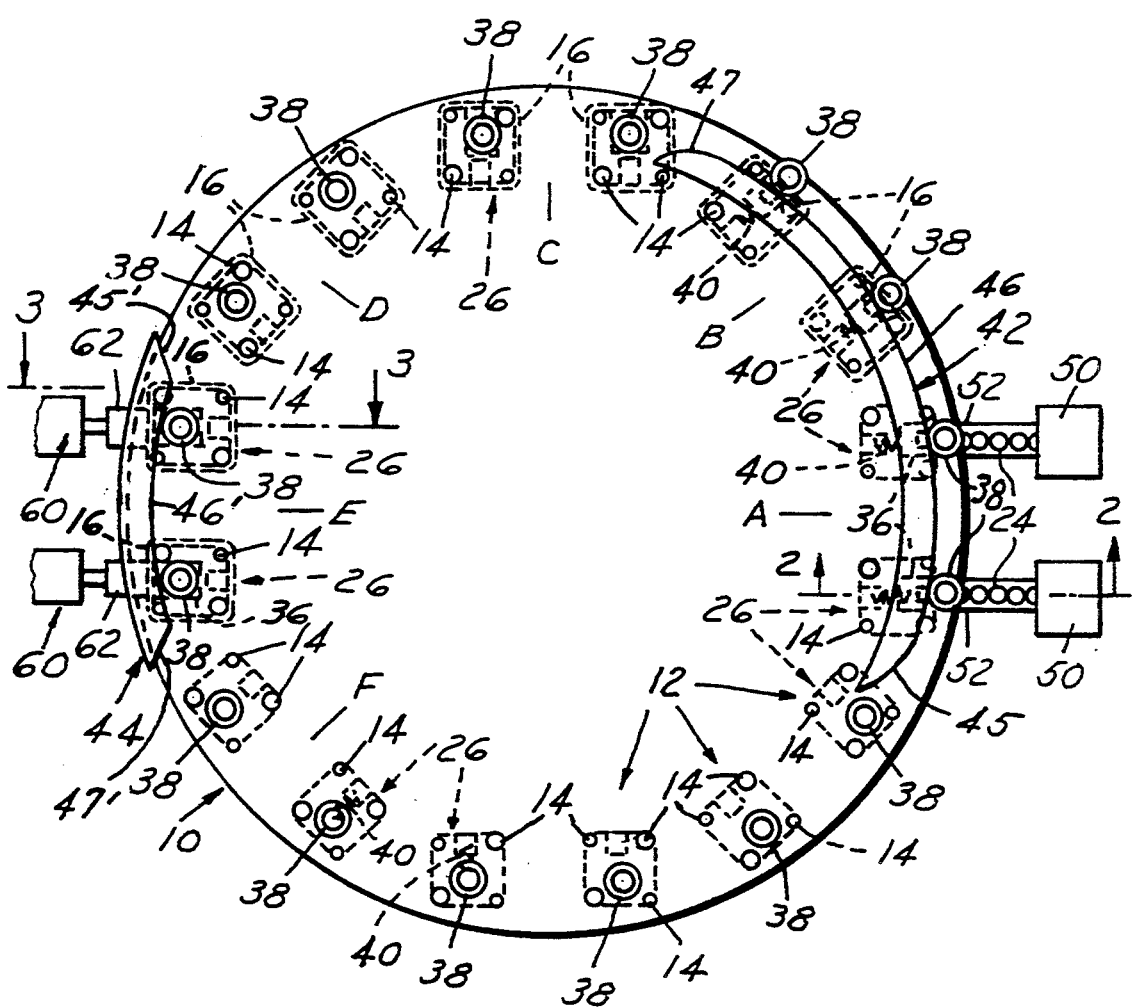
FIG. 1 is a plan view of a carousel type turret of a forming, filling and sealing machine embodying the invention.

Referring now to the drawings in greater detail, FIG. 1 illustrates an indexable carousel type turret 10 of a carton forming, filling and sealing machine. The turret 10 includes a plurality of pairs of mandrels 12, with each mandrel consisting of four corner posts 14 onto which a thermoplastic coated paperboard tubular carton 16 is slidably loaded and the bottom closure thereof closed and sealed. Typically, the bottom sealed, open top carton 16 is pulled off the mandrels, onto a conveyor (not shown) and carried to conventional filling and top closing and sealing stations.

Figure 5:
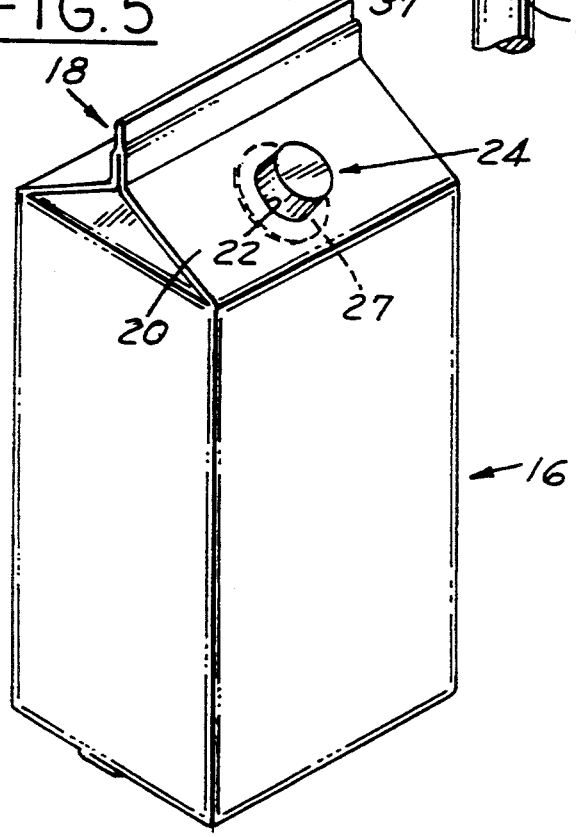
FIG. 5 is a perspective view of the finished carton product.
Figure 6:
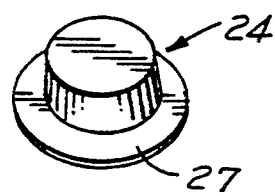
FIG. 6 is a perspective view of a pour spout fitment embodied in the invention.
Figure 3:
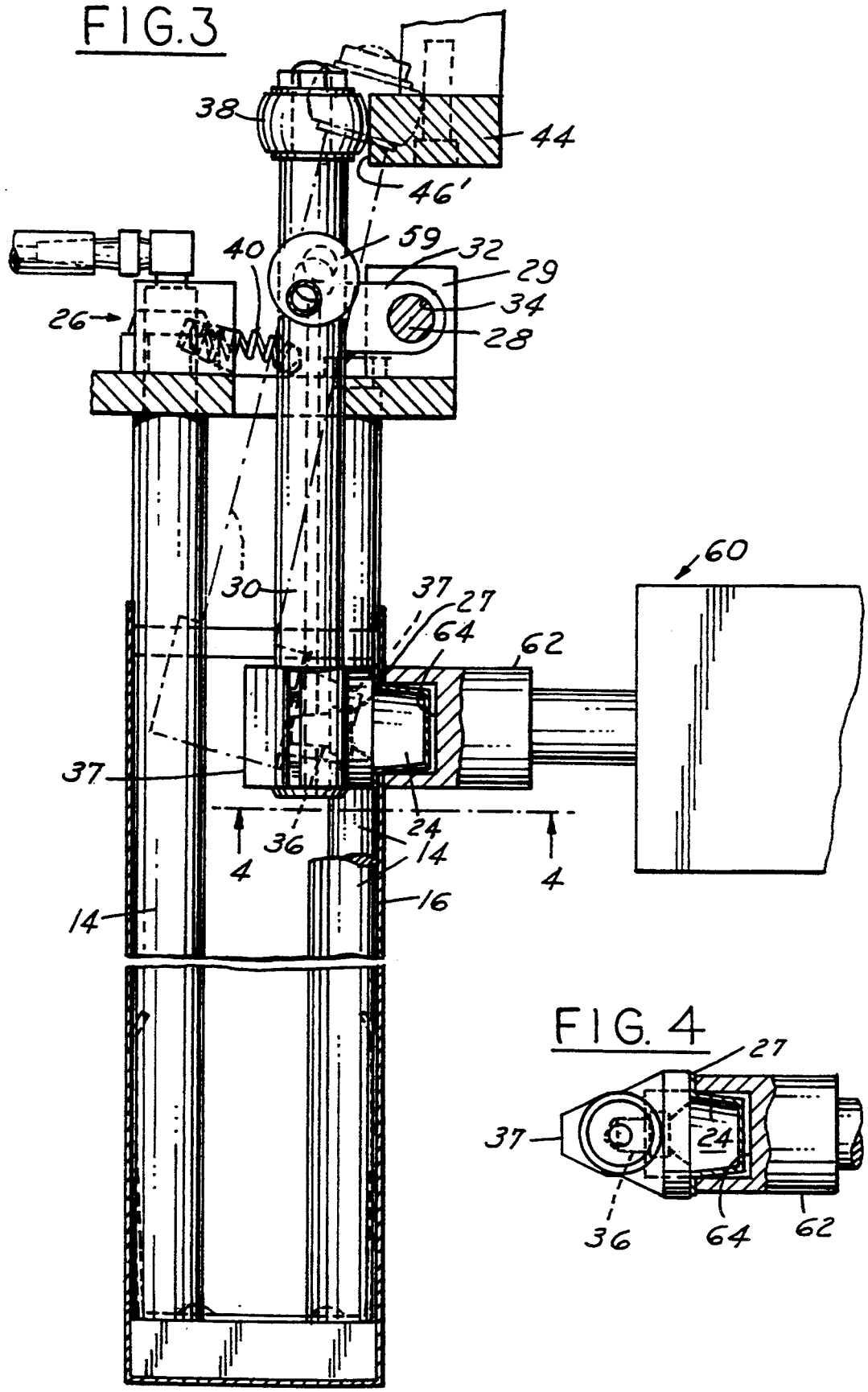
FIG. 3 is an enlarged side elevational view of the inventive pour spout fitment applicator portion of FIG. 1.
Figure 4:
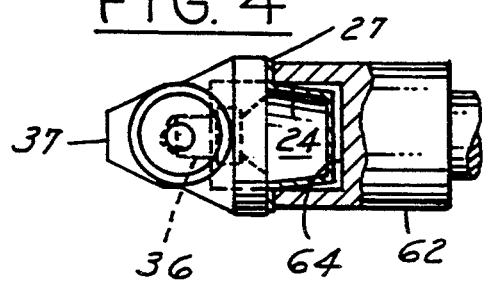
FIG. 4 is a cross-sectional view, partially broken away, taken along the plane of the line 4—4 of FIG. 3, and looking in the direction of the arrows.

While on the turret 10, each carton 16, in addition to having its bottom closure panels closed and sealed, in keeping with the features of this invention, includes top closure panels 18 (FIG. 5) wherein one of the panels 20 has an opening 22 formed therethrough, suitable for having a pour spout fitment 24 mounted and secured therein by a pour spout fitment applicator 26 (FIG. 3). The fitment 24 includes a flange 27, as shown in FIG. 6.

Figure 2:
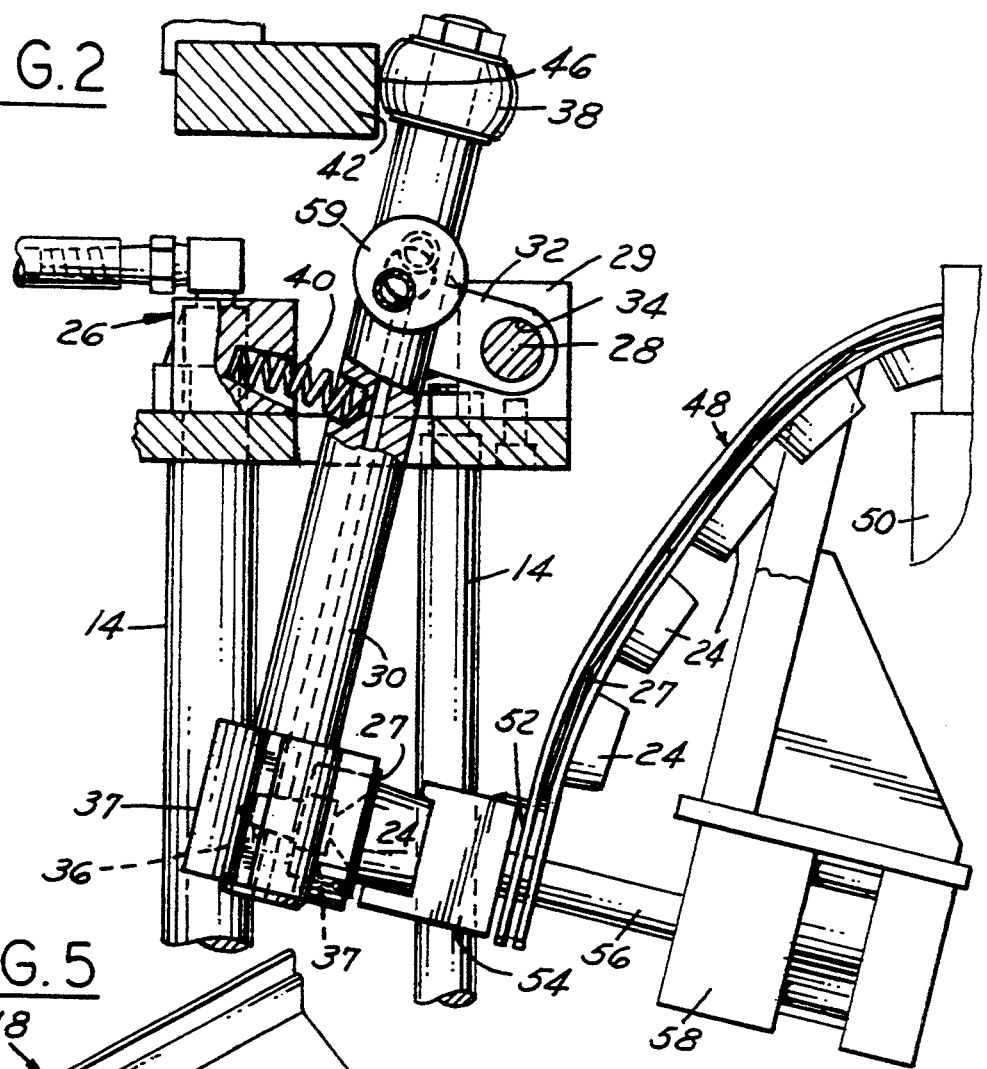
FIG. 2 is an enlarged side elevational view of the fitment feeder portion of FIG. 1.

As shown in FIGS. 2 and 3, the applicator 26 includes a shaft 28 pivotally mounted on a pivot block 29 secured to the turret 10. A projection 32 includes a opening 34 secured around the shaft 28 for rotation therewith. The distal end of the projection 32 is secured to a bar 30. The bar 30 extends vertically into the space within the four corner posts 14. A vacuum cup 36 or mechanical device, such as a location spigot, is mounted on the lower or anvil end 37 of the bar 30, and a roller 38 is rotatably mounted on the upper end portion of the bar. The roller 38 is urged toward the inside (FIG. 1) of the turret 10 by the force of a spring 40 (FIGS. 2 and 3) against the bar 30 in a counterclockwise direction about the shaft 28.

As shown in FIG. 1, a pair of circumferentially spaced apart cams 42 and 44 are mounted at predetermined locations around the turret 10. The cams 42 and 44 include respective entering ramp surfaces 45 and 45' (FIG. 1), working surfaces 46 and 46' and leaving ramp surfaces 47 and 47' for engagement by the rollers 38, as will be explained.

While cams 42 and 44 are shown in FIG. 1, along with pairs of mandrels 12, the following applicator description will relate to a single application.

As shown in FIG. 2, with the anvil 37 being in a retracted position due to contact of the roller 38 with the cam 42, a chute 48 is filled with a row of pour spout fitments 24 supplied in an oriented attitude by any suitable means, such as a vibratory parts feeder, represented as 50. The chute 48 is inclined at a predetermined angle from the parts feeder 50 to a location adjacent the two outer posts 14 of a selected station, say, "A", in FIG. 1. The lower end portion 52 of the chute 48 is angled, as shown in FIG. 2, such that a pusher unit 54 provided on the end of a piston 56 extending from a suitable cylinder 58 is adapted to engage the first-in-line fitment 24 and push it through the open back of the chute 48 and between the two outside posts 14 into contact with each vacuum cup or location spigot. Vacuum is applied, when appropriate, through an inlet 59, shown in FIG. 3. At the time of this action, the mandrel 12 is void of the paperboard carton 16.

Once a fitment 24 is loaded onto a vacuum cup or location spigot 36, the applicator 26 is indexed into station "B", with the roller 38 still in contact with the cam 42 to maintain the bar 30 in its angled position, which is significantly less than a right angle to the vertical, preferably less than 30°, in fact approximately 13° in FIG. 2. It is at this station B that a tubular carton 16 is slidably loaded onto the mandrel 12 around the anvil end 37 and its associated vacuum cup or location spigot 36. The now loaded mandrel 12 is indexed to a station "C" where the bar is turned into a vertical position and the fitment 24 is automatically extended through the opening 22 as the roller 38 follows and then departs from the ramp surface 47, due to the force of the spring 40 against the bar 30. Also at station C, the bottom closure panels of the tubular carton 16 are formed flat, followed by indexing to station "D" where the flat panels are heated and sealed in any usual manner. If desired, the bottom forming sequence may precede, or be performed concurrently with the fitment application step.

Next, the mandrel 12 is indexed to station "E", with the roller 38 having engaged the ramp surface 45' of the cam 44 and coming to rest on the surface 46', thereby forming a resistance to sealing forces. An ultrasonic sealer 60 including a retractable horn 62 is positioned adjacent the top closure panel 20, with its axis aligned with the opening 22 in the panel. A recess 64 is formed in the end of the horn 62, adapted to surround the extended portion of the fitment 24 and abut against the panel 20 opposite the flange 27 which is backed up by the anvil end 37. When energized, the vibrating horn 62 seals the flange 27 to the inner surface of the panel 20. The vacuum on the vacuum cup 36 is then relieved via the inlet 59, and the mandrel 12 is indexed to station "F" where the carton 16 is pulled off the mandrel by any conventional means and placed onto a conveyor (not shown) to be carried to filling and top forming and sealing stations prior to discharge. The discharged filled and sealed carton is shown in FIG. 5.

The cycle is repeated on each successive mandrel 12.

Figure 7:
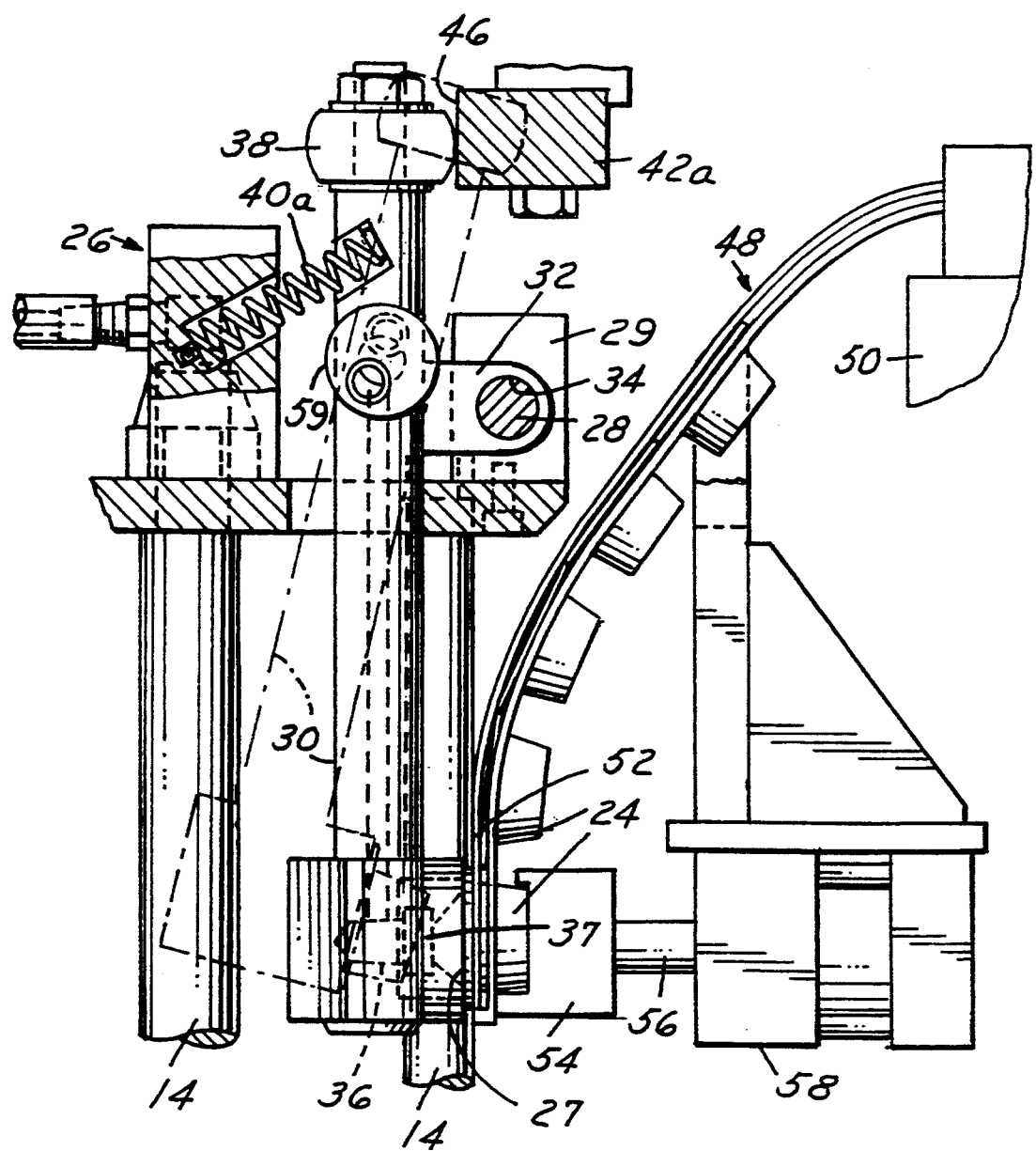
FIG. 7 is a side elevational view of an alternate embodiment of the FIG. 2 structure.

Referring now to FIG. 7, it is noted that a cam 42a may be used in lieu of the cam 42 of FIG. 2, and positioned on the opposite side of the roller 38. In this embodiment a spring 40a is adapted to urge the bar 30 in a clockwise direction about the shaft 28, into the phantom position in the Figure. The lower end portion 52 of the chute 48 is vertical to facilitate the application of the fitment 24 by the pusher unit 54, while the bar 30 is in the vertical orientation caused by the cam 42a. At station C, after the roller 38 leaves the cam 42a, and the spring 40a positions the bar 30 in the phantom position shown in FIG. 7, a carton 16 is loaded onto the mandrel 12 around the corner posts 14. After folding, heating and sealing at the stations C and D, upon engaging the cam 44 at station E, the bar 30 is caused to pivot into the solid line position in FIG. 3, to thereby project the fitment 24 into the opening 22, while the cam 44 provides the resistance to the sealing forces, as discussed above.

Industrial Applicability

It should be apparent that the invention provides an improved apparatus associated with a turret of a forming, filling and sealing machine for applying a pour spout fitment to the top closure of cartons mounted on the mandrels of the turret.

It should be further apparent that the invention is adaptable to either a carousel type turret or a vertically oriented turret so long as the mandrels thereof have a front central opening therein.

It should be still further apparent that the carton panel to which the pour spout fitment is applied could be part of a top closure panel which is completed as a flat top carton.

It should be still further apparent that, while eight pairs of mandrels are shown as being indexed together, the invention is adaptable to any suitable number of single or plurality of indexed mandrels.

While but two embodiments of the invention have been shown and described, other modifications thereof are possible within the scope of the following claims.

What is claimed is:

1. Apparatus comprising a mandrel for fittingly receiving an open-ended container externally of the mandrel, and fitment-applying means for applying a fitment to a wall of said container from internally of said container, said fitment-applying means comprising a fitment-holder and drive means serving to displace said fitment-holder towards said wall to apply a fitment to said container, characterized in that said fitment-holder is located internally of said mandrel for applying said fitment to said wall while said container is received over said mandrel wherein said fitment-applying means comprises a lever turnable about an axis and carrying said fitment-holder at one end thereof and arranged at the other end thereof to be acted upon by said drive means, and wherein, throughout each operating cycle of said fitment-applying means, said lever is oscillated through significantly less than a right-angle.

2. Apparatus according to claim 2, wherein said lever is an oscillatable bar and said fitment-holder comprises anvil means, said apparatus further comprising supply means for supplying the fitment-holder through an open side of said mandrel, sealing fitment to the anvil means, means for sealing said fitment in an opening in said wall against said anvil means, and loading means for loading said container onto said mandrel, said drive means serving also to displace said fitment-holder into a position of holding said fitment in the center of the mandrel, thereby permitting said loading means to load said container into said mandrel.

3. Apparatus according to claim 2, wherein said supply means comprises a chute for containing aligned oriented fitments, and feeder means for pushing the first-in-line fitment from said chute through said open side of said mandrel into holding engagement with said one of a vacuum cup and mechanical locator.

4. Apparatus according to claim 2, wherein said sealing means comprises an ultrasonic sealer and retractable horn adapted to engage the outer surface of said wall while said fitment is in place in said opening to thus weld a flange of said fitment to the inner surface of said wall.

5. Apparatus according to claim 2, and further comprising frame means and displacing means serving to displace said fitment-applying means relative to said frame means, said drive means comprising camming means fixed relative to said frame means, whereby the action of said displacing means causes said camming means to drive said fitment-applying means.

6. Apparatus according to claim 5, wherein said drive means includes resilient means operatively connected to said bar and once said fitment-applying means is no longer acted upon by said camming means, effective to displace said fitment-holder towards said wall.

7. Apparatus according to claim 2, wherein said drive means includes resilient means operatively connected to said bar for turning said bar into a position of holding said fitment in the center of the mandrel.

8. Apparatus according to claim 1, wherein said fitment-holder comprises one of a vacuum cup and a mechanical locator.

9. Apparatus comprising fitment-applying means for applying a fitment to a wall of an open-ended container from internally of said container, and container-holding means for holding said container in a position to have said fitment applied thereto, said fitment-applying means comprising a fitment-holder and drive means serving to displace said fitment-holder towards said wall to apply a fitment to said container, said fitment-applying means comprising a lever turnable about an axis and carrying said fitment holder at one end thereof and arranged at the other end thereof to be acted upon by said drive means, characterized in that, throughout each operating cycle of said fitment-applying means, said lever is oscillated through an angle of significantly less than a right-angle.

10. Apparatus according to claim 9, wherein said angle is less than 30°.

11. Apparatus for applying fitments to open-ended containers comprising a frame, a rotary turret rotatable relative to said frame, a mandrel attached to said turret for receiving said open-ended container and for holding said container in a position to have said fitment applied thereto, a fitment-applying means for applying said fitment to a wall of the open-ended container from internally of said container, said fitment-applying means comprising a fitment-holder, a drive means for displacing said fitment-holder towards said wall, said drive means comprises camming means fixed relative to said frame for engaging said fitment-holder, said camming means extends around said turret, said rotary turret displacing said fitment-applying means relative to said camming means, whereby said camming means acts upon said fitment-applying means to cause said fitment-holder to apply said fitment to the container.

12. Apparatus according to claim 11, wherein said camming means serves to displace said fitment-holder outwardly towards said wall.

13. Apparatus according to claim 11, wherein said camming means serves to displace said fitment-holder inwardly away from said wall.

* * * * *